United States Patent [19]

Mitchell

[11] 4,070,696

[45] Jan. 24, 1978

[54] METHOD AND APPARATUS FOR CANCELLING NONTONAL VARIATIONS IN A FACSIMILE SCANNER OUTPUT SIGNAL

[75] Inventor: Paul Mitchell, Glenview, Ill.

[73] Assignee: Teletype Corporation, Skokie, Ill.

[21] Appl. No.: 684,829

[22] Filed: May 10, 1976

[51] Int. Cl.² .......................... H04N 1/40; H04N 1/10
[52] U.S. Cl. ..................................... 358/280; 358/293
[58] Field of Search .............. 358/163, 280, 282, 285, 358/293, 302; 315/370, 371; 250/235

[56] References Cited

U.S. PATENT DOCUMENTS

| 2,965,711 | 12/1960 | James et al. | 178/7.2 |
| 3,697,683 | 10/1972 | Gates et al. | 178/7.1 |
| 3,852,640 | 12/1974 | McCarthy | 315/371 |
| 3,919,473 | 11/1975 | Cotter | 358/163 |

*Primary Examiner*—John C. Martin
*Attorney, Agent, or Firm*—W. K. Serp; J. C. Albrecht

[57] ABSTRACT

A circuit for cancelling nontonal variations in the output signal from a facsimile scanner. The circuit generates a location signal which corresponds to the physical location of the document sample. The location signal is passed through a function generator, inverted and thereafter multiplied with the output signal of the scanner. Since the characteristic of the inverted function generator output is the reciprocal of the nontonal characteristics of the scanner signal, the resulting output signal from the multiplier is substantially free of nontonal variations.

3 Claims, 1 Drawing Figure

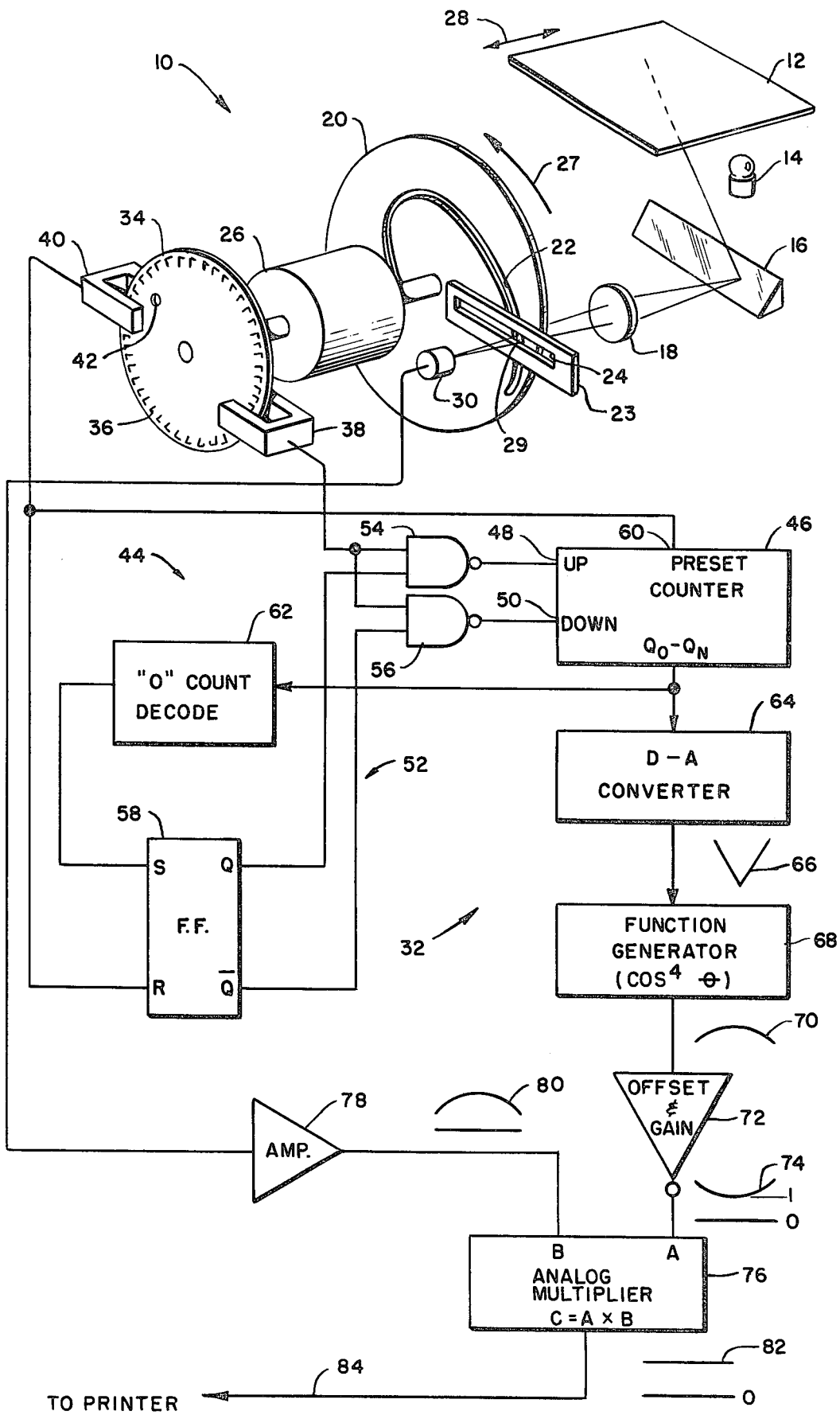

METHOD AND APPARATUS FOR CANCELLING NONTONAL VARIATIONS IN A FACSIMILE SCANNER OUTPUT SIGNAL

BACKGROUND OF THE INVENTION

This invention relates to a method and apparatus for correcting the output signal from a facsimile scanner and more particularly to an apparatus for cancelling the nontonal variations in the output signal of a facsimile scanner introduced by the scanning mechanism so as to provide a signal accurately representative of the tonal level of the scanned document.

Facsimile scanners progressively scan over the surface of a document successively measuring the contrast or tonal level of small discrete areas of the document and generate a signal related to the tonal level of each area of the document measured. One arrangement for accomplishing such scanning is described in U.S. patent application No. 621,902 filed Oct. 14, 1975, entitled "Apparatus and Method for Facsimile Scanning" by J. S. Abrams and having a common assignee with this invention. As described in this reference, light is reflected sequentially from each document area as determined by the coincidence of two rotating spiral apertures and a longitudinal slit. The reflected light is in the form of a serial stream of light impulse levels with the intensity of each impulse determined by the contrast of the area sampled. The photo pulses are passed through an optical system to a photodetector which converts the light levels into electrical signals for transmission to a graphic printer.

To facilitate physical positioning of the copy in the scanner, the copy is conveniently placed on a flat, transparent plate and scanned through the plate. It will be appreciated that with such a physical arrangement the light path length from the copy to the photodetector at extreme ends of the scan line is greater than the path length at the center of the copy. Thus, a document displaying a uniform gray scale over an entire scan line produces increased signal intensity at the center of the scan as compared to the signal intensity at the ends of the scan. It has been found that, with such an arrangement, the output signal, in response to a constant copy tonal level, varies as the cosine of the acute angle which the scanning path forms with the document raised to the fourth power (cosine$^4$).

Additionally, the illumination level from the light source over the document area may vary as a result of the unevenness and position of the light source introducing additional nontonal variations into the photodetector output signal. Thus, as a result of the characteristics of the scanning apparatus, variations may be introduced into the scanner output signal causing it to depart from a true representation of the tonal level of the document. Various systems have been suggested for compensating for such variations. One particular arrangement uses an aperture of varying size positioned between the light source and the document. The aperture serves to decrease the light intensity at the center of the document and increase the light intensity over the edges of the document. The construction of such an aperture is particularly difficult and therefore expensive since critical tolerances must be met. Additionally, the presence of such a light aperture greatly complicates the physical structure of the scanner.

Still another effort at correcting for such nontonal signal variations has been to place a varying intensity, neutral density filter between the light source and the document. Such a filter serves to reduce the light level directed at those portions of the document closest to the photodetector. The manufacture of such a filter is relatively expensive and requires the placement of a mounting structure within the facsimile scanner. The physical presence of such a filter considerably complicates the internal mechanical arrangement of the scanner and is rather expensive to manufacture. The illustrated embodiment corrects nontonal variations in the photodetector output signal by means of an electrical circuit which introduces a compensating signal serving to cancel nontonal variations in the output signal of the photodetector. As will subsequently be more fully appreciated, the illustrated circuit may be adapted to correct for nonuniform variations in the photodetector output, and since the correction apparatus is implemented by electronic components, the illustrated embodiment does not materially effect the complexity of the physical structure of the scanner.

SUMMARY OF THE INVENTION

Described is an apparatus for cancelling nontonal variations in the output signal from a facsimile scanner which successively samples the tonal level of selected areas of the document. The output signal from the scanner is distorted by nontonal variations related to the physical location of the document area being sampled. Means are included for generating a location signal corresponding to the physical position of that portion of the document being sampled. A compensating circuit operates upon the location signal providing a correction signal. The compensating circuit has a predetermined operating characteristic which is the reciprocal of the nontonal variations present in the output signal from the scanner. Means are described for combining the correction signal with the output signal from the scanner so that the output of the combining means is a signal substantially free of nontonal variations and therefore an accurate representation of the tonal level of the document area being sampled.

The facsimile scanner includes means for generating a series of pulses related to the physical location of the sampled area on the document. The pulses are fed to the clock input of a counter so that the state of the counter is related to the locations of the sampled area on the document. A digital to analog converter converts the state of the counter to an analog location signal which is fed to the compensating circuit.

A method for cancelling the nontonal variations in the output signal from a facsimile scanner is described including the steps of generating a location signal corresponding to the relative physical position of the sampled area with respect to the document. Additionally, the steps of operating upon the location signal with the reciprocal of the nontonal variations in the scanner output signal so as to produce a correction signal, and combining the scanner output signal with the correction signal so as to provide an information signal substantially free of nontonal variations are set forth.

It is a main object of this invention to provide an apparatus and method for compensating for nontonal variations in the output signal of a facsimile scanner. A further object is to provide such a signal compensating apparatus which compensates for nontonal signal variations in the photodetector output without complicating the physical structure of the scanner.

Other objects, advantages and features of the invention will be more readily appreciated after reference to the following description and accompanying drawings.

DESCRIPTION OF THE DRAWINGS

The single FIGURE illustrates a preferred embodiment of this invention with selected portions of a facsimile scanner pictorially represented.

DESCRIPTION OF THE ILLUSTRATED EMBODIMENT

Scanner

With reference to FIG. 1, selected portions of a facsimile scanner 10 are illustrated to provide a greater appreciation of the features of this invention. The scanner 10 serves to scan a document 12 which is positioned in a flat plane by suitable means (not shown). The document 12 is illuminated by a light source 14 which, for the purpose of illustration, will be assumed to provide uniform lighting over the entire document surface. However, as will be subsequently more fully appreciated, the hereinafter described circuit may be adapted to compensate for variations in the light source 14 of the document as well as other characteristics of the scanning mechanism. Light reflected from the document 12 is directed by a canted, elongated reflecting mirror 16 through a lens system 18 focused at the scanning mechanism. The scanning mechanism includes a rotating scanning disc 20 defining a spiral aperture 22 and a securely mounted rectangularly shaped member 23 defining a slit 24. A scanning motor 26 rotates the disc 20 in the direction of the arrow 27 and an exposure aperture 29 defined by the coincidence of the spiral 22 and the slit 24 progressively moves across the slit 24 thus scanning across the document 12. After a single document line is scanned, the copy is moved in the direction of the arrow 28 for scanning the next adjacent scan line. The reader's attention is directed to U.S. Pat. No. 3,011,020 issued Nov. 28, 1961 to G. M. Stamps and the aforecited Abrams application for a description of other suitable scanning arrangements.

Light passing through the exposure aperture 29 defined by the spiral 22 and the slit 24 passes to a scanning photodetector 30 which provides an output signal for processing by a compensating circuit 32 to be described. As previously mentioned, the scanning disc 20 is rotatably driven by the motor 26 which also drives, by means of a common shaft, a scan position disc 34. This disc defines, about its periphery, a plurality of closely spaced position apertures 36. Serving to sense the passage of each of the apertures 36 and generate a pulse train in response thereto is a detector 38 which internally includes a light source and cooperating photocell. It will be appreciated that the pulse train from the detector 38 is related to the movement of the scanning disc and therefore to the physical position of the sampled area on the copy. Generating a start of scan line pulse at the start of each scan line, is a second detector 40 positioned adjacent the disc and similarly including a light source and photocell. The disc 34 defines a single aperture 42 set inwardly of the periphery of the disc 34 so that for each complete rotation of the disc 34, a pulse is generated indicating the start of a scan line. Based upon the foregoing discussion, it will be appreciated that the number of pulse signals from the scan position detector 38 occurring after the start of scan detector 4o pulse provides an accurate indication of the location of the sampled area along a scan line on the document 12.

Correction Circuit

As previously mentioned, the output signal from the photodetector 30 will exhibit nontonal variations as a result of the flat document plane since the distance from the document 12 to the photodetector 30 will vary across the document scan. This signal distortion varies approximately as the cosine$^4$ of the acute angle which the light path from the sampled area to the lens forms with the surface document 12. To cancel the signal distortion, the compensating circuit 32 introduces a reciprocal compensation, that is, a compensation varying as the secant$^4$. It will subsequently be more fully appreciated that the circuitry disclosed can be readily adapted to compensate for various other undesired nontonal variations introduced by the physical characteristics of the scanning system.

The start of scan pulse from the detector 40 is fed to a scan position signal generating unit 44 which provides a digital output signal the level of which corresponds to the location of the area being scanned on the document. The position signal generating unit 44 includes and up-down presettable counter 46 having both up 48 and down 50 clocking inputs. A suitable counter may be constructed with binary counters sold under the marking indication SN 74193 by Signetics Corporation as well as equivalent integrated circuits sold by other manufacturers. Serving to clock the counter 46, the output pulse train from the scan position detector 38 is a counter direction control means 52 including a pair of counter direction clocking gates 54 and 56 which are switched by means of a counter direction control flip-flop. The gates 54 and 56 are NAND-gates with the output of the first NAND-gate 54 being connected to the up clock input 48 of the counter 46 and the output of the remaining NAND-gate 56 being connected to the down clock input 50 of the counter 46. One of the inputs of each of the dual input NAND-gates 54 and 56 are commonly connected to the output of the detector 38. The direct output "Q" of a gate control flip-flop 58 feeds the remaining input of the up count NAND-gate 54 and the complement output "$\overline{Q}$" of the direction control flip-flop 58 is fed to the remaining input of the down count NAND-gate 56. Thus, the state of the flip-flop 58 determines which of the NAND-gates will be enabled with the clock pulses from the detector 38 passing through that NAND-gate stepping the counter in the direction selected.

Serving to reset the flip-flop 58 at the start of the scanning cycle, the output of the start of scan detector 40 is fed to the reset input of the counter directional control flip-flop 58 and to a preset input 60 of the counter 46. In response to the start of a scan line, the counter 46 is preset to a desired count corresponding to the location of the start of a scan line and the complement output "$\overline{Q}$" of the flip-flop 58 goes high switching the pulse train from the detector 38 to the down input 50 of the counter 46. Serving to set the flip-flop 58 in response to a predetermined counter state is a counter direction reversing decoder 62 which decodes the zero state of the counter 46. In response to an output signal from the decoder 62, flip-flop 58 is set and the input to the up count NAND-gate 54 goes high and correspondingly the down count NAND-gate 56 goes low. This condition switches clock inputs to the counter 46 with the counter thereafter advancing in response to the pulse train from the scan position detector 38. Briefly, responding to a start of a scan pulse 40, the counter 46 presets to a value which corresponds to the location of the area on the document being sampled and thereafter the counter 46 counts down until the zero state is reached. The zero count state occurs when the distance from the photodetector 30 to the document 12 is the shortest; that is, at the center of a scan. Thereafter, the counter 46 advances until the area being sampled is at the other edge of the document 12; that is, the scanning beam is at the opposite end of the scan line.

As illustrated, the output of the counter 46 is fed to a digital to analog converter 64 which converts the binary output of the counter 46 to a representative linear voltage. Over the scan line, the output of the converter 64 is a symmetrical wave-shaped as illustrated at 66. The lowest level of the converter output signal 66 corresponding to the point at which the light path length from the photodetector 30 to the document 12 is the shortest. The output of the digital to analog converter 64 is fed to the input of a function generator 68 which is constructed to modify the input signal by a cosine function raised to the fourth power (cosine$^4$). As previously mentioned, the nontonal variations in the output signal from the photodetector 30, resulting from the change in the light path length over a document scan, follows the cosine to the fourth power and thus the reciprocal compensation for such a variation is a secant to the fourth power (secant$^4$). The output of the function generator 68 is illustrated at 70. The design of a function generator having cosine$^4$ characteristics or, for that matter, any other characteristics necessary to compensate for the nontonal variations in the scanner output signal is well-known in the art. Such constructional details are described in *Introduction to Operational Amplifiers Theory and Applications* by John V. Wait et al. published by McGraw Hill Book Co, 1975 (pages 245-249) and "Designer's Guide: Nonlinear Function Modules" September, 1969 *EEE Magazine* published by Mactier Publishing Corporation.

The output of the function generator is fed to a variable gain inverting amplifier 72 having both adjustable gain and adjustable output offset which is set to position the lowest level of the output wave 74 at unity. This amplifier inverts the cosine$^4$ input and thus the output of the amplifier is a secant$^4$ signal. The output of the amplifier 72 is fed to one input of an analog multiplier 76 the remaining input of which is fed by the scanner output signal from an amplifier 78 amplifying the output of the scanning photodetector 30. For purposes of illustration, it is assumed that the line being scanned on the document is of a uniform tonal value and since the output of the photodetector is uncorrected, such a uniform tonal value will produce a signal as illustrated at 80 having a cosine$^4$ nontonal variation. The output of the analog multiplier 76 is the product of the two inputs 74 and 80 and as illustrated at 82 is a constant level which corresponds to the uniform tonal value of the scan line of the document 12. It will be appreciated that the output of amplifier 72 when multiplied by the scanner output signal from the amplifier 78 is such as to provide a complete compensation for the nontonal variations in the scanner output signal thereby producing a signal for transmission to a facsimile printer via line 84 which accurately represents the tonal qualities of the document 12. The construction of the function generator 68 may be readily adapted to various scanning systems by adjusting the parameters of the components of the generator so as to compensate for other undesired variations in the scanning signal. In this way, the illustrated embodiment may be readily adapted to other scanning systems for the purpose of correcting the nontonal variations in the output signal therefrom.

Operation

In operation, the scanning disc 20 is rotatably driven by the motor 26 and the sample area of the document 12 progressively moves across the document. The start of scan pulse from the detector 40 presets the counter 46 and resets the flip-flop 58 and the pulses from the scan position detector 38 are fed to the down input 50 of the counter 46. As the disc 20 rotates, the sample area progressively moves across the document 12 until the binary level of the counter 46 output is zero. This level is recognized by the decoder 62 which generates an output signal setting the flip-flop 58 thus reversing the direction of the counter 46. As the document scan continues, the counter level increases in response to the pulse train from the position detector 38. The binary output of the counter 46, after being converted to a linear signal by the converter 64, is fed to the function generator 68 which corrects the converter 64 output by the nontonal variation error in the tonal output signal from the scanning photodetector 30.

In the illustrated embodiment, the correction is a secant$^4$ function. The output of the function generator 68 (cosine$^4$) is amplified, inverted and offset by a selected amount. The amplified scanning photodetector 30 output which exhibits a cosine$^4$ nontonal variation is fed to one input of the analog multiplier 76 for multiplication with the output of the amplifier 72. Multiplication of the secant$^4$ variation from the amplifier 72 cancels the cosine$^4$ variation of the scanning detector 30 output signal and thus, the multiplier output is a constant signal level corresponding to a uniform tonal value across the document. In this manner, the illustrated circuit serves to compensate for nontonal distortions in the scanning signal introduced by the characteristics of the scanning apparatus by generating a reciprocal compensating signal. The compensating signal, when multiplied by the scanner output signal cancels the scanner output signal distortion so that the signal sent to the printer is substanially devoid of distortion introduced by the scanning apparatus.

Thus, an apparatus has been described which compensates for distortions in a facsimile output signal introduced by the scanning apparatus. Although this invention has been particularly shown and described in connection with a preferred embodiment thereof, it will be appreciated that various changes in form and detail can be made without departing from the scope and spirit of the invention.

What is claimed is:

1. An apparatus for cancelling nontonal variations in the output signal from a facsimile scanner, the scanner serving to successively sample the tonal level at selected areas of a scanned document wherein the output signal from the scanner is distorted by the nontonal variations related to the physical location of the document area being sampled comprising:

means for generating a series of pulses related to the physical position of that portion of the document being sampled;

a counter clocked by said pulses so that the state of said counter is related to the location of the sampled area on the document;

means for presetting said counter to a predetermined value at the start of each document scan and for counting down said counter to a selected state in response to said pulses from said preset value and for advancing said counter thereafter during the remainder of said document scan;

a digital to analog converter converting the state of said counter to an analog location signal;

a compensating circuit operating upon the analog location signal and providing a correction signal, said compensating circuit having a predetermined operating characteristic which is the reciprocal of the nontonal variations present in the output signal from the scanner;

means for combining said correction signal from said compensating circuit with the output signal from the scanner, said combining means being an analog multiplier multiplying said scanner output signal by said correction signal from said compensating circuit so that said combining means provides a signal which is substantially free of nontonal variations and thus accurately representative of the tonal level of the document area being sampled.

2. The apparatus of claim 1 wherein said compensating circuit includes a function generator receiving said analog location signal and an amplifier having predetermined gain and offset characteristics for processing the signal from said function generator prior to introduction to said analog multiplier.

3. The apparatus of claim 1 wherein said nontonal variations in the output signal from the facsimile scanner follow the coefficient $\cosine^4$; and said compensating circuit has an operating characteristic which is the reciprocal of said nontonal variation that is $\secant^4$.

* * * * *